US012785520B2

(12) United States Patent
White et al.

(10) Patent No.: US 12,785,520 B2
(45) Date of Patent: Nov. 3, 2026

(54) HYBRID SLIPRING WOUND FIELD AND PERMANENT MAGNET ELECTRIC MACHINE AND METHOD OF OPERATING SAME

(71) Applicant: Kaney Aerospace, Inc., Rockford, IL (US)

(72) Inventors: Adam Michael White, Beavercreek, OH (US); David George Kloos, Dayton, OH (US)

(73) Assignee: Kaney Aerospace, LLC, Rockford, IL (US)

( * ) Notice: Subject to any disclaimer, the term of this patent is extended or adjusted under 35 U.S.C. 154(b) by 230 days.

(21) Appl. No.: 18/826,975

(22) Filed: Sep. 6, 2024

(65) Prior Publication Data

US 2025/0088080 A1 Mar. 13, 2025

Related U.S. Application Data

(60) Provisional application No. 63/538,211, filed on Sep. 13, 2023.

(51) Int. Cl.
*H02K 13/00* (2006.01)
*H02K 1/27* (2022.01)

(52) U.S. Cl.
CPC ............. *H02K 13/003* (2013.01); *H02K 1/27* (2013.01)

(58) Field of Classification Search
CPC ............................... H02K 13/003; H02K 1/27
See application file for complete search history.

(56) References Cited

U.S. PATENT DOCUMENTS

| | | | | |
|---|---|---|---|---|
| 4,780,659 | A | 10/1988 | Bansal et al. | |
| 7,414,343 | B2 | 8/2008 | Arita et al. | |
| 7,638,890 | B2 | 12/2009 | Lando et al. | |
| 8,148,866 | B2 | 4/2012 | Shah | |
| 10,658,959 | B2 | 5/2020 | Lando et al. | |
| 2018/0262091 | A1 | 9/2018 | Gieras et al. | |
| 2022/0103049 | A1* | 3/2022 | Fatemi | H02K 1/2766 |
| 2023/0011032 | A1 | 1/2023 | Feng et al. | |
| 2024/0405709 | A1* | 12/2024 | Pennington, III | H02P 23/14 |

* cited by examiner

*Primary Examiner* — Thomas Truong
(74) *Attorney, Agent, or Firm* — Amundsen Davis, LLC

(57) ABSTRACT

Electric power generators, generator or generation systems, related methods, and systems and applications including same are disclosed herein. In one example embodiment, a generator system includes a support structure, a stator, a rotor including each of a direct current (DC) wound field rotor portion having wire windings and a permanent magnet (PM) rotor portion, a slipring system, at least one control device (including rectifier) coupled at least indirectly between the stator and the slipring system, and an output port configured to make available an output power based at least indirectly upon alternating current (AC) power output by the stator when the rotor rotates relative to the stator. The at least one control device is configured to be able to generate, and communicate to the slipring interface system, DC current based at least indirectly upon the AC power output by the stator when the rotor rotates relative to the stator.

20 Claims, 5 Drawing Sheets

HYBRID SLIPRING WOUND FIELD AND PERMANENT MAGNET ELECTRIC MACHINE AND METHOD OF OPERATING SAME

CROSS-REFERENCE TO RELATED APPLICATIONS

Field of the Invention

The present invention relates to electric machines and, more particularly, to electric generators or generator systems, methods of operating same, and associated systems employing such generators, generator systems, and methods.

Background of the Invention

Conventional aircraft power generation solutions commonly utilize permanent magnet generators (PMGs) for a source of low power (e.g., excitation power) electrical energy in concert with an exciter machine, rotating rectifier, and a wound-field synchronous generation machine for "main" electrical energy for conversion to AC power.

Further in this regard, FIG. 1 is a schematic, substantially cross-sectional view of a conventional generator system 100 suitable for use some airplanes or aircraft. As shown, the generator system 100 includes a central shaft 102 rotatably supported upon first and second bearings 104 and 106, respectively. The cross-section shown in FIG. 1 is particularly taken along a central axis 150 of the central shaft 102. The central shaft 102 in turn supports each of a PMG rotor 108, an exciter rotor 110, and a main rotor 112. The exciter rotor 110 is an alternating current (AC) wound exciter, and the main rotor 112 is a direct current (DC) concentric wound rotor. As shown, the PMG rotor 108, exciter rotor 110, and main rotor 112 are axially spaced from one another along the central shaft 102 between the first and second bearings 104 and 106, with the PMG rotor 108 being positioned between the first bearing and the exciter rotor 110, the exciter rotor being positioned between the PMG rotor 108 and the main rotor 112, and the main rotor 112 being positioned between the exciter rotor and the second bearing 106. Windings of the exciter rotor 110 further are coupled by way of diode circuits 114 with windings of the main rotor 112, where the diode circuits 114 can be positioned within or along the central shaft 102.

Further as shown, the conventional generator system 100 also includes a PMG stator 118, an exciter stator 120, and a main stator 122. The PMG stator 118 is an AC wound field stator that is arranged to be concentrically positioned about, and axially-aligned with, the PMG rotor 108. The exciter stator 120 is a DC concentrated wound field stator that is arranged to be concentrically positioned about, and axially-aligned with, the exciter rotor 110. The main stator 122 is an AC wound stator that is arranged to be concentrically positioned about, and axially-aligned with, the main rotor 112. All of the central shaft 102, bearings 104 and 106, PMG rotor and stator 108 and 118, exciter rotor and stator 110 and 120, main rotor and stator 112 and 122, and the diode circuits 114, are generally situated and supported within a generator housing (or packaging) 116. Additionally as shown, windings of the PMG stator 118 are coupled by linkages 128 to a connector 124 formed along a wall or perimeter 126 of the generator housing 116, and also windings of the exciter stator 120 are coupled by linkages 130 to the connector 124. Further, windings of the main stator 122 are coupled by linkages 132 to a terminal block 134 formed along the wall or perimeter 126.

Also, the conventional generator system 100 includes a generator control unit (GCU)/converter 136 and a point of regulation (POR) 146. The GCU/converter 136 is coupled to the connector 124 and thereby to each of the linkages 128 and 130, respectively, by additional linkages 138 and 140, respectively. Also, the GCU/converter 136 is coupled to the terminal block 134 and thereby to the linkages 132 by additional linkages 142. Further, the POR 146 is coupled to the GCU/converter 136 both by further linkages 144 and further linkages 148. The further linkages 144 communicate power (e.g., 270 Volt DC power) from the GCU/converter to the POR, which can in turn (by additional linkages) provide that power to systems of the airplane/aircraft within which the conventional generator system 100 may be implemented. The further linkages 148 serve to communicate signals from the POR 146 to the GCU/converter 136 by which the GCU/converter can sense the exact power (and/or voltage and/or current) levels that are being made available to the airplane/aircraft (e.g., at the physical location of the POR) by the conventional generator system 100.

During operation of the conventional generator system 100, initial rotation of the central shaft 102 causes rotation of the PMG rotor 108 relative to the PMG stator 118, which causes current and power to flow from the PMG stator to the GCU/converter 136 via the linkages 128 and 138 and the connector 124. Upon that being provided to the GCU/converter 136, at least some current and power can then be provided from the GCU converter 136 to the exciter stator 120 via the linkages 130 and 140 and the connector 124. Ongoing rotation of the central shaft 102 also causes rotation of the exciter rotor 110 relative to the exciter stator 120, such that currents are developed within the windings of the exciter rotor. Consequently, currents and power can flow from the windings of the exciter rotor 110 via the diode circuits 114 to the main rotor 112, with the diode circuits also serving as a rotating rectifier (rotating along with the central shaft 102) that converts AC current and power provided at the exciter rotor 110 into DC current and power provided to the main rotor 112. Continued rotation of the central shaft 102 further causes rotation of the main rotor 112 relative to the main stator 122. Due to the DC current and power provided to the main rotor 112, AC current and power are developed in the main stator 122 and provided to the GCU/converter 136 via the via the linkages 132 and 142 and the terminal block 134.

The power received at the GCU/converter 136 from the main stator 122 can be modified or converted and, in the present embodiment, is converted from AC power to DC power (e.g., 270 Volts DC), which can then be provided to the POR 146 and thereby for use by the airplane/aircraft. Further, the GCU/converter 136 is configured to operate in a manner that controls or influences ongoing operation of the conventional generator system 100. In particular, based upon the signals received from the POR 146, as well as the current and power levels received from the PMG stator 118 and the main stator 122, the GCU/converter 136 can adjust the levels of current and power that are provided to the exciter stator 120. Further, by adjusting the levels of current and power that are provided to the exciter stator 120, the GCU/converter 136 can thereby influence the levels of current and power that are output by the main stator 122 and ultimately available to be provided via the POR 146 for use by the airplane/aircraft systems.

In view of the above description, it should be appreciated that such conventional aircraft electric power generation systems particularly include three separate electric machines integrated into a single assembly: a PMG, an exciter machine, and a main machine (each of which has a respective rotor and a respective stator). The generator control unit (GCU) regulates AC voltage (e.g., as output by the main stator 122), and also is configured to provide de-excitation in the event of a fault in the main power circuit. Where aircraft DC power is required, such conventional power generation solutions then rely on additional electrical components (e.g., power conversion components forming the "converter" portion of the aforementioned GCU/converter 136), so as to convert the AC power from the main stator 122 into DC power with desired characteristics. For example, such additional electrical components can include power conversion components configured to provide passive 6-pulse rectification, 12-pulse rectification utilizing coupled inductors, or active rectification.

Although conventional electrical power generation systems such as that described in regard to FIG. 1 are often able to deliver power having desired characteristics to airplanes/aircraft in regard to which such conventional power generation systems are implemented, such conventional power generation systems are disadvantageous in certain respects. In particular, because such conventional power generation systems employ three separate electric machines as described above (namely, the PMG, exciter machine, and main machine, each with its own rotor and its own stator), such conventional power generation systems tend to have undesirably high mass. This can be detrimental to their implementation in airplanes/aircraft in terms of cost, insofar as it is frequently desirable to reduce weight in order to achieve fuel savings. Also, because such conventional power generation systems employ three separate electric machines, these power generation systems tend to be complex and costly to manufacture and implement.

For at least one or more of these reasons, or one or more other reasons, it would be advantageous if new or improved electric power generators or power generation systems (and/or systems employing such improved power generators or power generation systems) could be developed, and/or improved methods of operation and/or assembly of electric power generators or power generation systems could be developed, so as to address any one or more of the concerns discussed above or to address one or more other concerns or provide one or more benefits.

SUMMARY

In at least one example embodiment, the present disclosure relates to an electric power generator system. The system includes a support structure, a stator supported fixedly in relation to the support structure, and a shaft supported rotatably in relation to the support structure. Also, the system includes a rotor supported upon the shaft, where the rotor is also rotatable with respect to the support structure and with respect to the stator, where the rotor includes each of a direct current (DC) wound field rotor portion having wire windings and a permanent magnet (PM) rotor portion. Additionally, the system includes a slipring system including sliprings supported on the shaft and a slipring interface system supported fixedly in relation to the support structure, where the sliprings are electrically coupled to the wire windings. Further, the system includes at least one control device coupled at least indirectly between the stator and the slipring system, and an output port that is coupled at least indirectly to the at least one control device or to the stator, and that is configured to make available an output power based at least indirectly upon alternating current (AC) power output by the stator when the rotor rotates relative to the stator. The at least one control device includes a rectifier within the support structure, and is configured to be able to generate, and communicate to the slipring interface system, DC current based at least indirectly upon the AC power output by the stator when the rotor rotates relative to the stator, so that at a first time the AC power output includes each of a first component arising due to a first rotating of the PM rotor portion relative to the stator and also a second component arising due to a second rotating of the DC wound field rotor portion relative to the stator when the DC current communicated to the slipring interface system is further communicated to the sliprings and to the wire windings.

Further, in at least one example embodiment, the present disclosure relates to a method of generating electric power. The method includes providing an electric power generator system. The electric power generator system includes a support structure, a stator supported fixedly in relation to the support structure, a shaft supported rotatably in relation to the support structure, and a rotor supported upon the shaft, where the rotor includes each of a direct current (DC) wound field rotor portion having wire windings and a permanent magnet (PM) rotor portion. The system also includes a slipring system including a slipring interface system and sliprings supported on the shaft and electrically coupled to the wire windings, at least one control device coupled at least indirectly between the stator and the slipring system, and a point of regulation (POR) that is coupled at least indirectly to the at least one control device or to the stator, the at least one control device including a rectifier. The method further includes, during an initial operational phase, generating a first power having a first electrical characteristic that appears at the POR, the first power being based at least indirectly upon a first alternating current (AC) power output by the stator only or substantially only in response to a first rotating of the PM rotor portion relative to the stator. The method also includes, during a ramp-up operational phase, generating a second power having a second electrical characteristic that appears at the POR, the second power being based at least indirectly upon a second AC power output by the stator in response to both of a second rotating of the PM rotor portion relative to the stator and a third rotating of the DC wound field rotor portion relative to the stator when a first DC current provided by the at least one control device at least indirectly to the slipring system is flowing through the wire windings. The method additionally includes, during a steady-state operational phase, generating a third power having a desired electrical characteristic that appears at the POR, the third power being based at least indirectly upon a third AC power output by the stator in response to both of a fourth rotating of the PM rotor portion relative to the stator and a fifth rotating of the DC wound field rotor portion relative to the stator when a second DC current provided by the at least one control device at least indirectly to the slipring system is flowing through the wire windings.

Additionally, in at least one example embodiment, the present disclosure relates to an electrical power generation system. The system includes a support structure, a stator supported fixedly in relation to the support structure, and a shaft supported rotatably in relation to the support structure. The stator includes a nine-phase main stator winding includes first, second, and third three-phase winding sets. Also, the system includes a rotor supported upon the shaft, where the rotor is also rotatable with respect to the support structure and with respect to the stator, where the rotor includes each of a direct current (DC) wound field rotor portion having wire windings and a permanent magnet (PM) rotor portion. Further, the system includes a slipring system including sliprings supported on the shaft and a slipring interface system supported fixedly in relation to the support structure, where the sliprings are electrically coupled to the wire windings. Also, the system includes an output port that is coupled at least indirectly to the stator, and that is configured to make available an output power based at least indirectly upon an alternating current (AC) power output by the stator due to one or both of a first rotating of the PM rotor portion relative to the stator and a second rotating of the wire windings relative to the stator when a DC current is flowing through the windings. Additionally, the system includes means for outputting the DC current to the slipring system so that the DC current can proceed to flow via the slipring system to and through the wire windings, wherein the DC current is determined based upon how at least one sensed electrical characteristic of the output power compares to a desired output power electrical characteristic.

Notwithstanding the above examples, the present invention is intended to encompass a variety of other embodiments including for example other embodiments as are described in further detail below as well as other embodiments that are within the scope of the claims set forth herein.

BRIEF DESCRIPTION OF THE DRAWINGS

Embodiments of the disclosure are disclosed with reference to the accompanying drawings and are for illustrative purposes only. The disclosure is not limited in its application to the details of assembly or arrangements of components, or orderings of process steps, illustrated in the drawings or described in relation thereto. The disclosure is capable of other embodiments or of being practiced or carried out in other various manners. In the drawings, like parts are labeled with like reference numbers. In the drawings.

DETAILED DESCRIPTION

The present inventors have recognized that the mass, complexity, and cost of conventional aircraft power generators such as those described above is adversely impacted by the inclusion of the three separate electric machines within each generator. The present inventors have further recognized that it would be advantageous to develop a power generator or power generation system that would serve as a system for generating electric power (such as, for example, regulated DC power) from a rotating prime mover in which the power generator or power generating system employs less than three separate electric machines, as such a power generator or power generation system can achieve operation with reduced mass, complexity, and/or cost compared to conventional power generation solutions. Such a power generator or power generation system having less than three separate electric machines can be implemented, for example, in any of a variety of applications including, for example, by serving as an airplane/aircraft power generation solution. Also, in at least some embodiments, such a power generator or power generation system having less than three separate electric machines can serve as an integrated solution for creating a source of regulated low voltage ripple DC power from a rotating prime mover.

Figure 1:
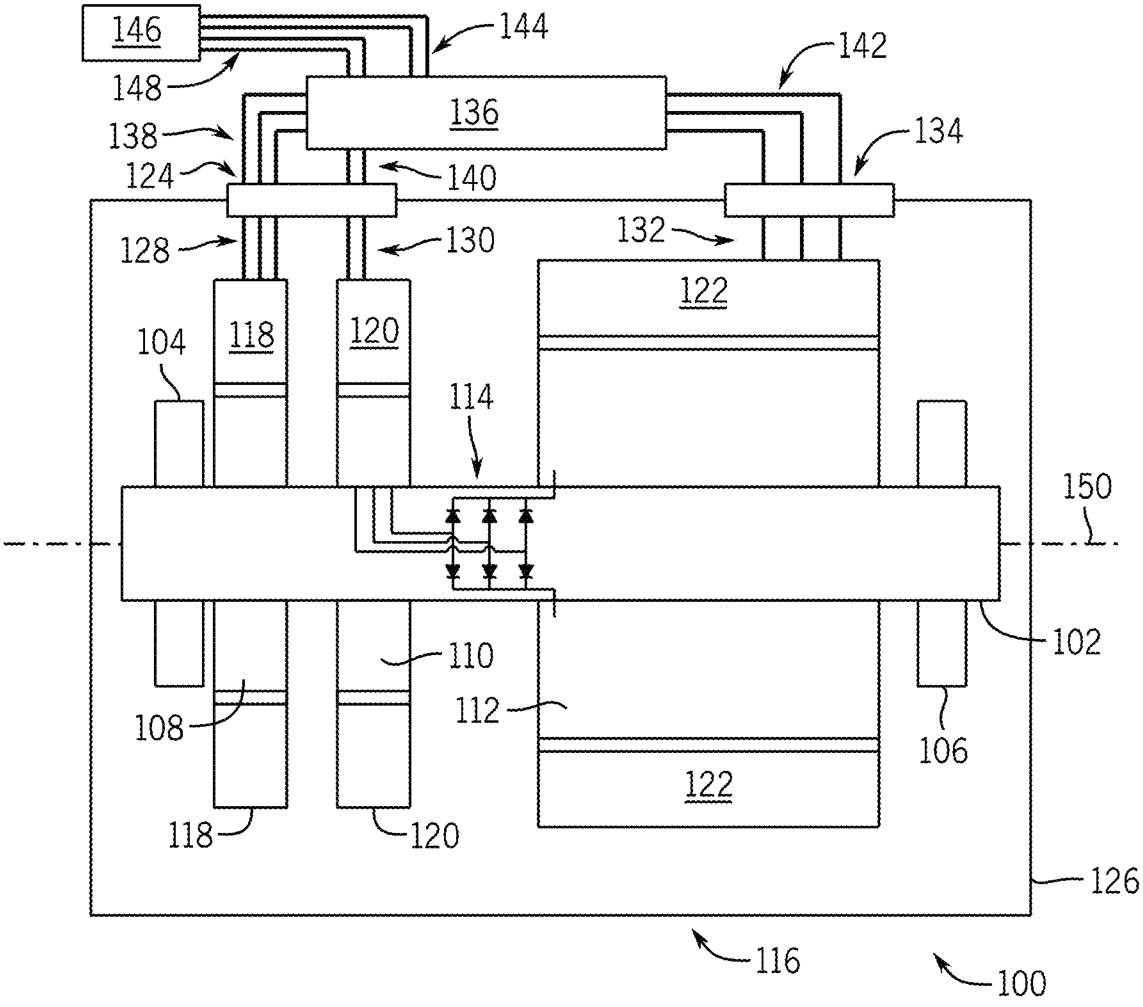
FIG. 1 (PRIOR ART)
FIG. 1 is a schematic, substantially cross-sectional view of a conventional (Prior Art) electric power generation system, where the cross-section is taken along a central axis of a central shaft of the electric power generation system.

In an example embodiment encompassed herein, such a power generator or power generation system includes a synchronous generator with a hybrid rotor utilizing both permanent magnets and a wound-field. The permanent magnets are used to provide a source of initial excitation when no external electrical power is available at start, to minimize the size of the wound-field components required and to minimize the conduction losses that are created by the wound-field. Additionally, in contrast to a conventional power generation system (such as that of FIG. 1) that includes an exciter machine that is separate from a main machine and also includes the diode circuits on the rotating shaft as a rotating rectifier for providing power to the wound-field in the main machine, in the present example embodiment the synchronous generator includes slip rings that are used to conduct excitation power across an air-gap to the wound field of the rotor.

Further, in the present embodiment, the synchronous generator also includes a multi-phase main stator winding, with a minimum of two phases being required (in at least the present embodiment) to provide constant power output versus time at steady-state. Also, in the present embodiment, the power generation system includes a generator control unit providing excitation to the synchronous generator to produce an AC output voltage. Further, in the present example embodiment the power generation system also includes an AC-to-DC rectifier to create a DC voltage based upon the AC output voltage output by the synchronous generator and, by converting the AC to DC, serves to create a source of DC power. The AC-to-DC rectifier assembly may be packaged within the synchronous generator, the generator control unit, or independently. Additionally, in the present example embodiment, the DC voltage is measured at the Point of Regulation (POR). Based upon the DC voltage measured at the POR, which is monitored by the generator control unit, the generator control unit in turn controls excitation of the synchronous generator to regulate the DC voltage appearing at the POR to a desired value as the motor (e.g., rotor/rotating shaft) speed and electrical load conditions vary.

Further, at least some embodiments example encompassed herein operate by using a hybrid rotor generator system (or generator or generation system) with sliprings along with a rectifier and a GCU to generate and regulate DC power. In at least some such embodiments, implementation (or manufacturing) of the generator system includes sizing the permanent magnets of the generator system so as to maximize the permanent magnet (PM) portion of the output voltage up to the safe operating limit, then using the wound field for the remainder required. Also, in at least some such embodiments, operation of the generator system includes using the wound field to cancel out the voltage created by the PMs, for example to eliminate voltage production during a fault or to lower the output voltage otherwise produced by the magnets to an acceptable, regulated level. Further, in at least some example embodiments encompassed herein, a hybrid rotor generator includes sliprings and a nine-phase winding. In at least some such embodiments, the hybrid rotor generator not only includes sliprings and a nine-phase winding, but also includes an 18-pulse rectifier. Further in at least some such embodiments, the hybrid rotor generator includes sliprings, a nine-phase winding, and an 18-pulse rectifier, where the 18-pulse rectifier particularly is formed by the series connection of three three-phase rectifiers.

Figure 2:
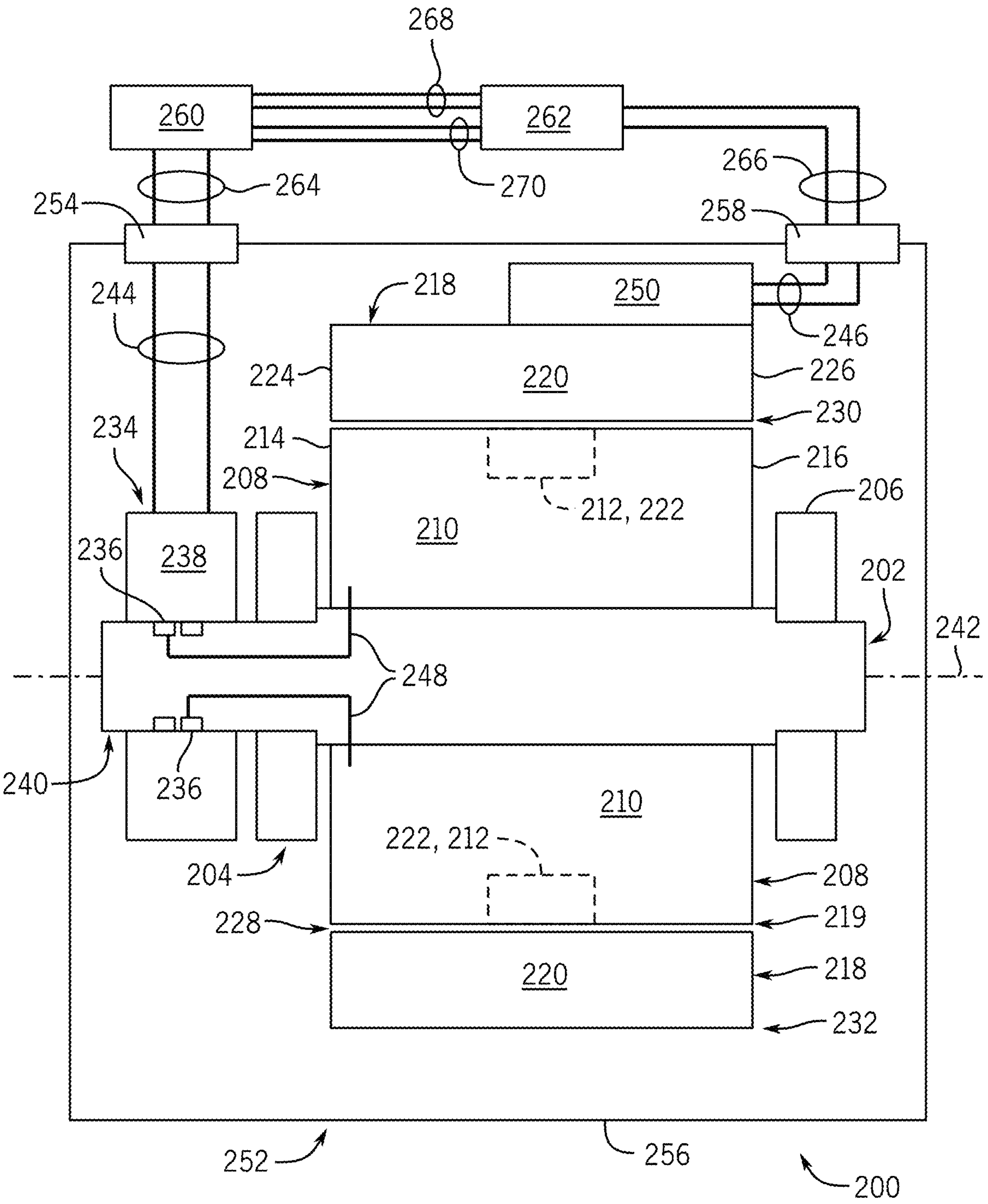
FIG. 2 is a schematic, substantially cross-sectional view of an improved electric power generation system, where the cross-section is taken along a central axis of a central shaft of the electric power generation system, in accordance with an example embodiment encompassed herein.

Referring now to FIG. 2, a schematic, substantially cross-sectional view is provided of an improved electric power generator system (or improved electric power generator or generation system) 200 in accordance with an example embodiment encompassed herein. The generator system 200 is suitable for use in, or in relation to, a variety of systems or applications including, for example, to provide electric power to an airplane or aircraft. As shown, the generator system 200 includes a central shaft 202 rotatably supported upon first and second bearings 204 and 206, respectively. The central shaft 202 supports a rotor 208 between the first and second bearings 204 and 206. The cross-sectional view provided FIG. 2 is particularly taken along a central axis 242 of the central shaft 202.

In the present embodiment, the rotor 208, which can also be referred to as a main rotor, is a hybrid rotor in that it includes both a first, direct current (DC) wound field rotor portion (or portions) 210 and a permanent magnet (PM) rotor portion (or portions) 212. The DC wound field rotor portion 210 particularly includes (or is made up of or formed by) wire windings arranged around substantially the entire axial length of the rotor 208 along the central shaft 202 between a first end 214 and a second end 216 of the rotor, respectively, which are proximate the first bearing 204 and the second bearing 206, respectively. Also, the wire windings of the DC wound field rotor portion 210 generally also extend radially outward from the central shaft 202 to an outer cylindrical (or annular) perimeter 219 of the rotor. The PM rotor portion 212 includes, in the present embodiment, a plurality of discrete permanent magnets 222 arranged along or proximate to the outer cylindrical perimeter 219. In the present embodiment, the permanent magnets 222 are particularly arranged along the outer cylindrical perimeter 219 at locations that are approximately midway axially between the first end 214 and the second end 216 of the rotor 208.

Although only two of the permanent magnets 222 are visible in FIG. 2 given the particular cross-sectional view that is provided, it should be appreciated that there are additional ones of the permanent magnets that are spaced around the outer cylindrical perimeter 219 at other circumferential locations around the central shaft 202. In the present example embodiment, there are particularly six of the permanent magnets 222 equidistantly (or substantially equidistantly) spaced circumferentially apart from one another around the outer cylindrical perimeter 219, for example, at 60 degree (or substantially 60 degree) intervals apart from one another. Each of the permanent magnets 222 can be associated with a given pole (e.g., north or south), with permanent magnets of opposite poles being situated diametrically opposed from one another on the rotor 208.

In alternate embodiments, there can be other numbers of the permanent magnets such as, for example, twelve of the permanent magnets that are positioned at different circumferential locations around the central shaft 202. Also, in other alternate embodiments, the PM rotor portion 212 can take the form of an annular ring or substantially annular ring of permanent magnets, permanent magnet material or portions of permanent magnet material. Further, in still other alternate embodiments, the PM rotor portion 212 can include permanent magnets (or permanent magnet material) that is distributed not only at different circumferential locations around the outer cylindrical perimeter 219 of the rotor 208 at a single axial location, but also possibly at one or more circumferential locations around the central shaft 202 at two or more axial locations and/or at one or more different radial positions relative to the central axis 242 in addition to (or instead of) at or proximate to the outer cylindrical perimeter 219.

Further as shown, the generator system 200 also includes a stator 218, which can also be referred to as a main stator, and also a rectifier 250. In the present embodiment, the stator 218 is arranged to be concentrically positioned about, and axially-aligned along the central axis 242 with, the rotor 208. More particularly, the stator 218 extends axially, along the central axis 242, between a first end 224 and a second end 226 of the stator, which respectively are axially aligned with the first end 214 and the second end 216, respectively, of the rotor 208. An annular air gap 228 exists between the outer cylindrical perimeter 219 of the rotor 208 and an inner cylindrical (or annular) perimeter 230 of the stator 218. Additionally, the stator 218 is an AC wound field stator that includes wire windings arranged around substantially the entire axial length of the stator 218 between the first end 224 and the second end 226. In the present embodiment, the wire windings of the stator 218 also can be considered to occupy an annular region of the stator 218 extending radially outward (away from the central axis 242) from the inner cylindrical perimeter 230 to an outer cylindrical (or annular) perimeter 232 of the stator, and these wire windings can be referred to as an AC wound field stator portion 220.

Also as illustrated, in the present embodiment the rectifier 250 is mounted on the stator 218, for example, along the outer cylindrical perimeter 232. Although not shown, it should be appreciated that the rectifier 250 is electrically coupled to the windings of the stator 218 so that the rectifier can receive AC current and power from the stator 218 during operation of the generator system 200. During such operation, the rectifier 250 can convert that AC power into DC power that can be output at electrical connectors (or linkages) 246. Notwithstanding that the rectifier 250 is shown to be mounted on the stator 218 in FIG. 2, in alternate embodiments the rectifier need not be physically mounted on or coupled to, or adjacent to, the stator, but rather can be located in another position. In such embodiments, additional electrical connectors (which can for example be extensions of the wire windings of the stator) can be employed to electrically couple the stator with the rectifier.

Additionally, the generator system 200 includes a slipring system 234 that in the present embodiment is provided along the central shaft 202 proximate the first bearing 204. In the present embodiment, the first bearing 204 is positioned axially between the slipring system 234 and the rotor 208 such that the slipring system 234 is near the exterior of the generator system 200, with such positioning of the slipring system 234 facilitating accessibility and also enabling the first bearing 204 to serve as a buffer between the slipring system and the rotor (although in alternate embodiments the slipring system 234 can be in a different position relative to other components of the generator system 200). The slipring system 234 includes two (or more) sliprings 236 that are mounted along an exterior surface 240 of the central shaft. Also, the slipring system 234 additionally includes a slipring interfacing system (or mechanism) 238 that is positioned along the central shaft 202 proximate (or adjacent) to the exterior surface 240, and that can extend circumferentially or concentrically around the central shaft (and the central axis 242). The slipring interfacing system 238 includes or is connected to electrical connectors (or linkages) 244 by which the slipring interfacing system can obtain DC input power (as described further below). Also, the sliprings 236 are coupled to the windings of the rotor 218 by electrical connectors (or linkages) 248, which can also be considered part of the slipring system 234. The electrical connectors 248 extend along the central shaft 202 between the sliprings 236 and the rotor 208 and in some embodiments can for example be extensions of the wire windings of the rotor.

The slipring interfacing system 238 and the sliprings 236 particularly are configured to allow for electrical connections to be established therebetween, notwithstanding relative rotation of the central shaft 202 and the sliprings 236 relative to the slipring interfacing system. It will be appreciated that the slipring system 234 more particularly is configured to allow for the electrical connections between the sliprings 236 and the slipring interfacing system 238 to change periodically as the central shaft 202 rotational position changes relative to the slipring interfacing system. Due to the electrical connections established between the slipring interfacing system 238 and the sliprings 236, it should be appreciated that DC electric power received at the slipring interfacing system 238 by the electrical connectors 244 can in turn be communicated to the wire windings of the DC wound field rotor portion 210 by the sliprings 236 and the electrical connectors 248.

In the present embodiment, all of the central shaft 202, bearings 204 and 206, rotor 208, stator 218, slipring system 234, rectifier 250, and electrical connectors 244, 246, and 248 are generally situated and supported within a generator housing (or packaging or support structure) 252 of the generator system 200. The central shaft 202 and rotor 208 particularly are rotatably supported in relation to the generating housing 252 by the bearings 204 and 206. Further as shown, the electrical connectors 244 are coupled between the slipring interfacing system 238 and a connector (or port) 254 formed along a wall or perimeter 256 of the generator housing 252. Also, the electrical connectors 246 are coupled between the rectifier 250 and a terminal block 258 formed along the wall or perimeter 256.

Additionally, in the present embodiment, the generator system 200 includes a generator control unit (GCU) (which also can include a power converter and/or be considered a GCU/converter) 260 and a point of regulation (POR) 262. The GCU 260 is coupled to the connector 254, and thereby to the slipring interfacing system 238 by the electrical connectors 244, by additional electrical connectors (or linkages) 264. Additionally, the POR 262 is coupled to the terminal block 258 by additional electrical connectors (or linkages) 266. Further, the POR 262 is coupled to the GCU 260 by additional electrical connectors (or linkages) 268 and also additional electrical connectors (or linkages) 270. Although shown to be positioned outside of the generator housing 252, in another embodiment the GCU 260 can be positioned within the generator housing.

The additional electrical connectors 266 allow for electric power received at the terminal block 258, from the rectifier 250 by the electrical connectors 246, to be communicated to the POR 262, which can in turn (e.g., by additional electrical connectors or linkages, not shown) provide that power to systems of the airplane/aircraft within which the generator system 200 may be implemented. That is, the POR 262 typically serves as a terminal or port at which power generated by the generator system 200 is provided or output for use by (although not shown) systems or applications (or other components or devices) such as an airplane/aircraft in relation to which the generator system has been implemented.

Also, the additional electrical connectors 268 serve to communicate signals from the POR 262 to the GCU 260 by which the GCU can sense the exact power levels that are being made available to the airplane/aircraft (e.g., at the physical location of the POR) by the generator system 200. Further, the additional electrical connectors 270 allow for excitation power to be communicated from the POR 262 to the GCU 260. Also, the additional electrical connectors 264 allow for power to be communicated from the GCU 260 to the connector 254, and further to the slipring interface system 238 by the electrical connectors 244. It should be appreciated that any of the electrical connectors (or linkages) 244, 246, 248, 264, 266, 268, and 270 described above can take any of a variety of forms depending upon the embodiment, including for example wires or other linkages involving metal conductor or other materials as well as, in some circumstances, wireless linkages (e.g., in the case of the additional electrical connectors 268, for providing power sensing signals from the POR to the GCU).

Operation of the generator system 200 in the present embodiment at least partly is controlled by the GCU 260. More particularly, the GCU 260 can control the amount and characteristics of power provided by the GCU to the slipring interface system 238 (and thus to the wire windings of the DC wound field rotor portion 210 of the rotor 208) in response to or based upon the power (and/or voltage and/or current) levels sensed at the POR 262 and/or the amounts of power (and/or voltage and/or current) that are received by the GCU from the POR. It should be appreciated that the power (and/or voltage and/or current) levels existing at the POR 262 are of particular interest from the standpoint of controlling operation of the generator system 200, because it is those power (and/or voltage and/or current) levels that are made available to the airplane/aircraft (or other system, application, or load) in regard to which the generator system 200 is implemented.

Further, it should be recognized that the power (and/or voltage and/or current) levels presented at the POR 262 can also vary significantly from the power (and/or voltage and/or current) levels presented at the rectifier 250 or the terminal block 258. Indeed, the additional electrical connectors 266 are intended to be representative of electrical connectors or linkages that in some embodiments or applications can be physically lengthy, such that the power (and/or voltage and/or current) levels presented at the POR 262 may be significantly different (e.g., less) than the corresponding levels presented at the terminal block 258. For example, if the generator system 200 is implemented in regard to an airplane/aircraft, the additional electrical connectors 266 can be representative of electrical connectors or linkages that extend large distances within the airplane/aircraft (e.g., the length of a wing or large portion of a wing) such that, to achieve a voltage of 270 DC Volts (270 Vdc) at the POR for use by the airplane/aircraft, a higher voltage such as 275 DC Volts (275 Vdc) will be appropriately output at the terminal block 258.

Operation of the generator system 200 can be understood as encompassing at least three different phases (or modes) of operation, including an initial phase of operation, a ramp-up phase of operation, and a steady-state phase of operation. During the initial phase of operation of the generator system 200, initial rotation of the central shaft 202 causes rotation of the rotor 208, and particularly rotation of the permanent magnets 222 thereof, relative to the wire windings of the AC wound field stator portion 220 of the stator 218. This movement of the permanent magnets 222 relative to the wire windings of the stator 218 causes initial AC currents to be induced in those wire windings. Consequently, initial AC current and power flow from the wire windings of the stator 218 to the rectifier 250. The rectifier 250 in turn converts that initial AC current and power to initial DC current and power and provides that initial DC current and power (and corresponding voltages) to the terminal block 258 via the electrical connectors 246 and further from the terminal block to the POR 262 via the additional electrical connectors 266.

Additionally during such initial operation, at least some of the initial DC current and power (and/or voltage) provided to the POR 262 is further communicated to the GCU 260 by the additional electrical connectors 270. Based upon the power (or voltage or current) levels existing at the POR 262 as sensed by the GCU 260 via the additional electrical connectors 268, the GCU in turn causes at least some of the initial DC current and power (and/or voltage) received from the POR 262 via the additional electrical connectors 270 to be communicated to the connector 254 via the additional electrical connectors 264. Correspondingly that initial DC current and power provided to the connector 254 by the GCU 260 (or at least some of that current and power) is further communicated from the connector 254 to the slipring interfacing system 238 via the electrical connectors 244. Upon reaching the slipring interfacing system 238, that DC current and power is communicated to the sliprings 236, for example due to contact between the slipring interfacing system and the sliprings. That DC current and power received by the sliprings 236 is then further communicated from the sliprings 236 to the wire windings of the DC wound field rotor portion 210 of the rotor 208 by the electrical connectors 248.

As such DC current and power begins to reach the wire windings of the DC wound field rotor portion 210 of the rotor 208, such DC current and power influences the continued operation of the generator system 200, and at that time (or correspondingly at the time when the GCU 260 begins to direct that DC current and power to the slipring interfacing system 238) the generator system 200 can be understood as having entered the second phase of operation, namely, the ramp-up phase of operation. When operating in this ramp-up phase of operation, the movement of the permanent magnets 222 relative to the wire windings of the AC wound field stator portion 220 of the stator 218 continues to cause AC currents to be induced in those wire windings, and continues to result in current and power flow from those wire windings of the stator to the rectifier 250. The particular characteristics and levels (e.g., magnitudes and/or phase variations) of the current and power that flow to the rectifier 250 in this circumstance will vary depending upon, for example, the rotational movement (e.g., angular velocity) of the rotor 208 and permanent magnets 222 about the central axis 242.

However, also in this ramp-up phase of operation, as the DC current and power received at the sliprings 236 further passes through the wire windings of the rotor 208, the movement of the wire windings of the rotor with the DC current therewithin relative to the wire windings of the stator 218 causes additional AC current and associated power to be induced in those wire windings of the stator. That additional AC current and power induced in the wire windings of the stator 218 in turn flows from those wire windings of the stator to the rectifier 250. Thus, during the ramp-up phase of operation, the rectifier 250 receives AC current and power (and associated voltages) that each include two components, a respective first component arising from movement of the permanent magnets 222 relative to the wire windings of the stator 218 and a respective additional (or second) component arising from movement of the wire windings of the rotor 208 that are carrying DC current relative to the wire windings of the stator.

Upon receiving the AC current and power (including both the first and additional components as described above) during the ramp-up phase, the rectifier 250 converts that AC current and power to DC current and power, and provides that DC current and power (and associated voltages) to the terminal block 258 via the electrical connectors 246. That DC current and power (and associated voltages) is in turn further communicated from the terminal block to the POR 262 via the additional electrical connectors 266. It should be appreciated that the DC current and power (and associated voltages) output by the rectifier 250 during the ramp-up phase typically is at higher levels than what were output by the rectifier 250 during the initial phase of operation. This is because the DC current and power output by the rectifier 250 during the ramp-up phase is based upon AC current and power developed at the stator 218 not only due to movement of the permanent magnets 222 relative to the wire windings of the stator 218 as during the initial phase, but also due to movement of the wire windings of the rotor 208 relative to the wire windings of the stator when the wire windings of the rotor are carrying DC current received by the slipring system 234. For these reasons, the DC current and power communicated to the POR 262 in these operational circumstances can be referred to as ramp-up DC current and power, to distinguish that DC current and power from the initial DC current and power arising merely from the movement of the permanent magnets 222 relative to the wire windings of the rotor 218.

As the ramp-up phase of operation continues, at least some of the ramp-up DC current and power (and/or voltages) provided to the POR 262 is further communicated to the GCU 260 by the additional electrical connectors 270. Based upon the power (and/or current and/or voltage) levels existing at the POR 262 as sensed by the GCU 260 via the additional electrical connectors 268, the GCU in turn causes at least some of the ramp-up DC current and power received from the POR 262 to be communicated to the connector 254 via the additional electrical connectors 264. Correspondingly that DC current and power (and/or voltages) provided to the connector 254 by the GCU 260 (or at least some of that current and power) is further communicated from the connector 254 to the slipring interfacing system 238 via the electrical connectors 244. Upon reaching that slipring interfacing system 238, that DC current and power (and associated voltages) is communicated to the sliprings 236, for example due to contact between the slipring interfacing system and the sliprings. Upon reaching the sliprings 236, that DC current and power is further communicated from the sliprings to the wire windings of the DC wound field rotor portion 210 of the rotor 208 by the electrical connectors 248.

As described previously, as such DC current and power begins to reach the wire windings of the rotor 208, such DC current and power further influences the continued operation of the generator system 200. In general, the levels of AC current and power (and associated voltages) developed at the wire windings of the AC wound field stator portion 220 of the stator 218 vary directly (positively) in response to the levels of DC current and power (and associated voltages) received at the wire windings the DC wound field rotor portion 210 of the rotor 208. Thus, during the ramp-up phase of operation, to the extent that the DC current and power (and associated voltages) provided to the wire windings of the rotor 208 is increasing, this results in increasing AC current and power (and associated voltages) being developed at the wire windings of the stator 218 and provided to the rectifier 250. Further, upon such increasing AC current and power (and associated voltages) being provided to the rectifier 250, the rectifier in turn outputs increasing DC current and power (and associated voltages) that is then communicated via the electrical connectors 246 to the terminal block 258 and further by the additional electrical connectors 266 to the POR 262.

Based upon the above description, it should be appreciated that, during the ramp-up phase of operation, a feedback loop can emerge. That is, as the DC current and power that is provided from the GCU 260 to the rotor 208 (via the additional electrical connectors 264, the connector 254, the connectors 244, the slipring system 234, and the electrical connectors 248) continues to increase from zero to higher and higher levels, the AC current and power developed at the wire windings of the rotor 208 and provided to the rectifier 250 also increase to higher and higher levels. Correspondingly, as the AC current and power provided to the rectifier 250 increases, the DC power (and/or voltage and/or current) levels that are communicated via the electrical connectors 246, the terminal block 258, and the additional electrical connectors 266 to the POR 262, and that accordingly are present at the POR 262, also increase. Further, assuming that the GCU 260 continues to sense at, and receive from, the POR 262 increasing amounts of DC current and power (and/or higher voltages)—and assuming that the GCU also continues to provide increasing amounts of DC current and power (and/or associated voltages) for receipt by the rotor 208 via the slipring system 234, based upon the increasing amounts of DC current and power that the GCU is receiving from the POR—then the AC current and power being developed at the wire windings of the stator 218 will increase even more than before, such that the cycle continues.

At some point the power (and/or voltage and/or current) levels provided to and available at the POR 262 will attain desired levels, which for example can be levels that are appropriate for use by the airplane/aircraft in relation to which the generator system 200 is implemented. At such time when the GCU 260 senses via the additional electrical connectors 268 that the power (and/or voltage and/or current) levels available at the POR 262 have attained the desired levels, the GCU 260 can maintain the levels of DC current and power (and associated voltages) that are provided for receipt by the wire windings of the DC wound field rotor portion 210 of the rotor 208 so that the AC current and power developed at the stator 218 no longer increase or otherwise vary, and so that consequently the power (and/or voltage and/or current) levels available at the POR 262 remain at those desired levels and no longer change. Further, the GCU 260 can continue to operate to sense the power (and/or voltage and/or current) levels available at the POR 262 over time and, as appropriate, can operate to maintain constant, or can make adjustments to increase or decrease, the levels of DC current and power (and associated voltages) that are provided for receipt by the rotor 208, so that the power (and/or voltage and/or current) levels available at the POR 262 remain constant or substantially constant at the desired levels.

Such operation of the GCU 260 and corresponding operation of the generator system 200 overall can be considered operation in the steady-state phase, in that such operation causes the output power (and/or voltage and/or current) levels available at the POR 262 to remain constant or substantially constant, notwithstanding changes in other operational conditions such as the load placed on the generator system or operating temperature. The particular power (and/or voltage and/or current) levels at the POR 262 to which the GCU 260 may act to maintain the generator system 200 during the steady-state phase of operation can vary depending upon the embodiment. For example, in the present embodiment, it may be considered desirable that the POR 262 present an output voltage level of 270 Vdc. Thus, although the POR 262 may initially present an output voltage level of 20 Vdc when the generator system 200 is operating in the initial phase and may present an output voltage level increasing from 20 Vdc to 270 Vdc when the generator system 200 is operating in the ramp-up phase, the output voltage presented at the POR 262 will remain at or substantially at 270 Vdc when the generator system 200 is operating in the steady state phase of operation.

It should be appreciated that the GCU 260 can take any of a variety of forms to achieve desired control of the operation of the generator system 200, based upon the power (and/or voltage and/or current) levels sensed at the POR 262 and the DC current and/or power received from the POR. In some implementations, for example, the GCU can be a microprocessor, microcontroller, or other computer device. In some such implementations, such a computer device includes at least one processor (or processing device) and at least one memory device storing programming that includes instructions in accordance with which the at least one processor operates. In some additional implementations, also for example, the GCU can include other devices such as one or more programmable logic devices (PLDs), one or more application specific integrated circuits (ASICs), and/or one or more other circuit devices. Also, depending upon the embodiment, the GCU can take into account other types of information as it operates to provide control of the generator system 200 including, for example, the operating temperature of the device, the rotational speed of the central shaft 202 or the rotor 208, or the load receiving power from the generator system 200.

Notwithstanding the above description, the present disclosure is also intended to encompass numerous additional embodiments (or versions or implementations) of generator systems that are consistent or substantially consistent with the description of the generator system 200 provided above and that also may have additional or more particular features. For example, in at least some implementations of the generator 200, the permanent magnets 222 are sized to maximize back-EMF (counter-electromotive force or back-electromotive force) up to the limit where fault currents generated by the permanent magnets might cause damage to the generator and/or external system. Further, the DC wound field rotor portion 210 and/or AC wound field stator portion 220 (wire windings or coils provided on one or both of the rotor 208 and stator 218) and/or GCU 260 can be sized to provide the incremental rotor magnetic field required to meet electrical power and voltage requirements for the application in regard to which the generator system 200 is implemented (e.g., for the airplane/aircraft).

By comparison with conventional permanent magnet-only machines, embodiments encompassed herein having hybrid rotors with both wound field and permanent magnet rotor portions are advantageous in that these embodiments can enhance system performance during faults. Although the permanent magnets 222 cannot be turned off in terms of the fields those magnets provide, the wound field rotor portions of the rotors can be turned off (e.g., by ceasing the flow of DC current through those rotor portions). Consequently, by designing to a maximum tolerable fault current level created by the PM rotor portion 212 of the rotor field, a common problem associated with conventional permanent magnet-only machines can be resolved. More particularly, a winding design for low impedance together with permanent magnets designed for full rated output voltage can result in high inherent uncontrollable fault currents which are undesirable but, by maximizing the use of permanent magnets up to this limit, requirements of the wound-field are minimized and system safety is enhanced.

Additionally for example, in at least some implementations of the generator 200, during generator and/or electric power system faults, the polarity of excitation can be reversed and the GCU 260 can provide excitation current that is regulated such that the net magnetic field of the rotor 208 is substantially zero. That is, during such operation, the magnetic field produced by the permanent magnets 222 is cancelled by the magnetic field produced by the DC wound field rotor portion 210 resulting in substantially zero output voltage. This added level of control during faults reduces induced voltage and therefore fault current to substantially zero, thus maximizing or enhancing system safety.

Further for example, in at least some implementations of the generator 200, the AC wound field stator portion 220 is or includes a nine-phase main stator winding including three three-phase sets (or winding sets), where the phases within each three-phase set are phase-shifted at an electrical angle of 120 degrees from one another and the three three-phase sets are phase-shifted at an electrical angle of 40 degrees from one-another. Nine-phases are appropriate for performing 18-pulse rectification, which greatly improves power quality relative to ubiquitous three-phase, 6-pulse rectification. Additionally, in some such embodiments, the rectifier 250 is an 18-pulse passive rectifier, comprised of three series-connected 6-pulse three-phase rectifiers. Also, each of the 6-pulse rectifiers is connected to a three-phase winding set from the generator, where the phases of each of the phases within the three-phase winding set are phase-shifted from one-another at an electrical angle of 120 degrees.

Figure 4:
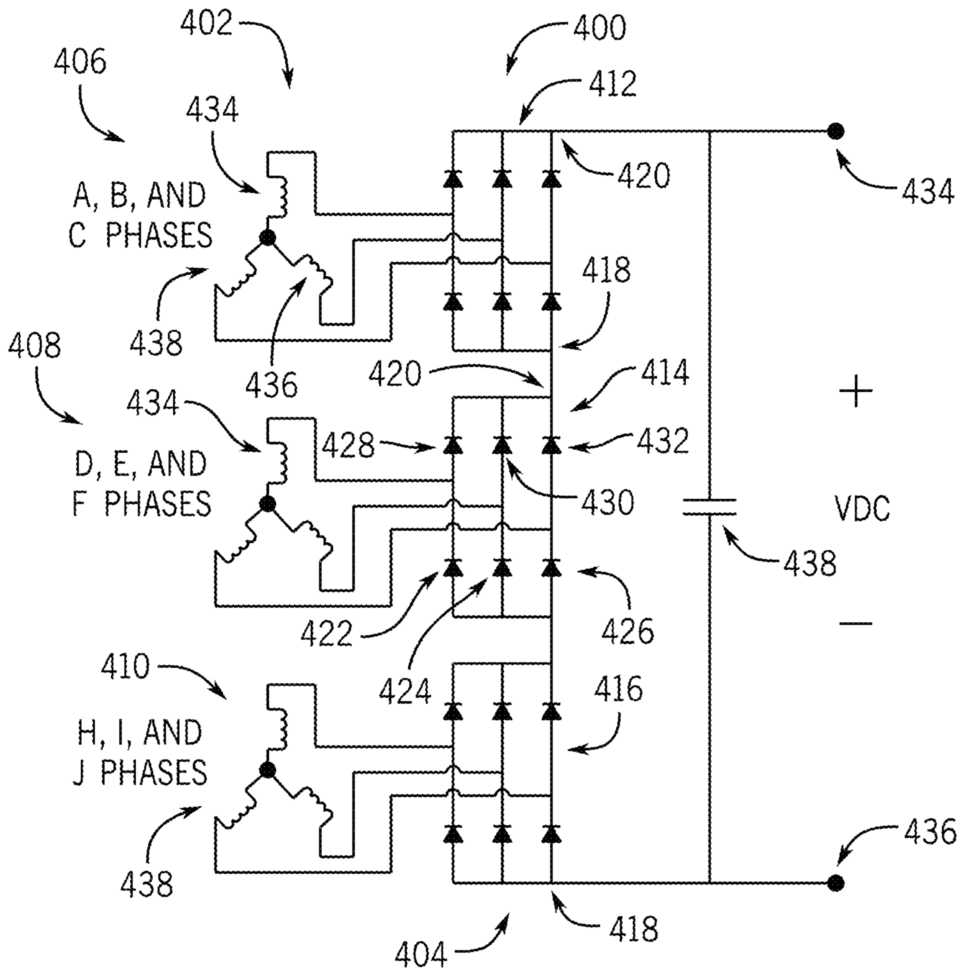
FIG. 4 is a schematic diagram illustrating a combination circuit representative of both an AC wound field stator portion and a rectifier portion, which can in at least some example embodiments or implementations be employed within improved electric power generation systems such as the generator systems of FIG. 2 and FIG. 3.

Additionally in this regard, FIG. 4 is provided to schematically illustrate an example combination circuit 400 having both an example implementation of the AC wound field stator portion 220, shown schematically as an AC wound field stator portion 402, in combination with an example implementation of the rectifier 250, shown schematically as a rectifier portion 404. As illustrated, the AC wound field stator portion 402 of the combination circuit 400 includes three three-phase sets of windings, namely, a first three-phase set 406, a second three-phase set 408, and a third three-phase set 410. Also, the rectifier portion 404 includes three series-connected 6-pulse three-phase rectifiers, namely, a first 6-pulse three-phase rectifier 412, a second 6-pulse three-phase rectifier 414, and a third 6-pulse three-phase rectifier 416. Each of the first, second, and third 6-pulse phase rectifier 412, 414, and 416 respectively includes a respective first port 418 and a respective port 420, and also respectively includes first, second, third, fourth, fifth, and sixth diodes 422, 424, 426, 428, 430, and 432, respectively. Further, each of the first, second, and third three-phase sets 406, 408, and 410 respectively includes first, second, and third windings 434, 436, and 438, respectively, which are Y-connected.

In the present embodiment, the respective first, second, and third windings 434, 436, and 438 of the first three-phase set 406 can be considered A, B, and C phase windings, respectively. Also, the respective first, second, and third windings 434, 436, and 438 of the second three phase set 408 can be considered D, E, and F phase windings, respectively. Further, the respective first, second, and third windings 434, 436, and 438 of the third three phase set 410 can be considered G, H, and I phase windings, respectively. As illustrated, the A, D, and G windings are respectively coupled to the respective first ports 418 of the first, second, and third three-phase rectifiers 412, 414, and 416, respectively, by the respective first diodes 422 of those respective rectifiers, and are respectively coupled to the respective second ports 420 of the first, second, and third three-phase rectifiers 412, 414, and 416, respectively, by the respective fourth diodes 428 of those respective rectifiers. Also, the B, E, and H windings are respectively coupled to the respective first ports 418 of the first, second, and third three-phase rectifiers 412, 414, and 416, respectively, by the respective second diodes 424 of those respective rectifiers, and are respectively coupled to the respective second ports 420 of the first, second, and third three-phase rectifiers 412, 414, and 416, respectively, by the respective fifth diodes 430 of those respective rectifiers. Further, the C, F, and I windings are respectively coupled to the respective first ports 418 of the first, second, and third three-phase rectifiers 412, 414, and 416, respectively, by the respective third diodes 426 of those respective rectifiers, and are respectively coupled to the respective second ports 420 of the first, second, and third three-phase rectifiers 412, 414, and 416, respectively, by the respective sixth diodes 432 of those respective rectifiers.

As noted above, the first, second, and third three-phase rectifiers 412, 414, and 416 are series coupled between a first overall rectifier terminal 434 and a second overall rectifier terminal 436 of the rectifier portion 404. The second overall rectifier terminal 436 is electrically the same terminal (or port or node) as the first port 418 of the third three-phase rectifier 416, and the first overall rectifier terminal 434 is electrically the same terminal (or port or node) as the second port 420 of the first three-phase rectifier 412. Further, the first port 418 of the first three-phase rectifier 412 is coupled directly to (is the same node as) the second port 420 of the second three-phase rectifier 414, and the first port 418 of the second three-phase rectifier 414 is coupled directly to (is the same node as) the second port 420 of the third three-phase rectifier 416. Also, in the present embodiment a capacitor 438 links the first and second overall rectifier terminal 434 and 436. During operation, an overall DC voltage Vdc appears between the first and second overall rectifier terminals 434 and 436.

Figure 5:
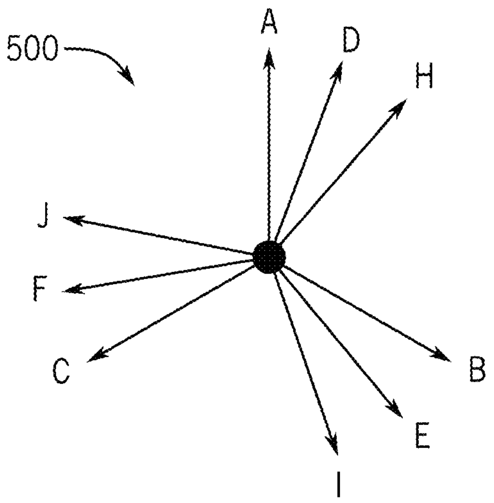
FIG. 5 is a schematic diagram illustrating figuratively relative example phase relationships between windings and/or sets of windings of the AC wound filed stator portion of FIG. 4.

Further in the present example embodiment of FIG. 4, during operation the nine different phase windings A, B, C, D, E, F, G, H, and I can have particular phase relationships as illustrated figuratively in FIG. 5 by a schematic diagram 500. As illustrated in FIG. 5, in the present embodiment, the respective A, B, C windings (or winding phases) are each phase shifted 120 degrees relative to (or from) one-another to form a three-phase set. Likewise, the respective D, E, and F windings (or winding phases) are each phase shifted 120 degrees from one-another to form a three-phase set. Further, the respective H, I, and J windings (or winding phases) are each phase shifted 120 degrees from one-another to form a three-phase set. Further, second three-phase set of windings D, E, and, F is shifted 40 degrees from the first three-phase set of windings A, B, and C. Additionally, the third three-phase set of windings G, H, and I is shifted 40 degrees from the second three-phase set of windings D, E, and F (and also is shifted 80 degrees from the first three-phase set of windings A, B, and C). Thus, further for example, the phase of the winding D is 40 degrees shifted from the phase of the winding A, the phase of the winding E is 40 degrees shifted from the phase of the winding B, and the phase of the winding F is 40 degree shifted from the phase of the winding C. Also, because the phase of the winding B is shifted 120 degrees from the phase of the winding A, and because the phase of the winding E is shifted 120 degrees from the phase of the winding D, then correspondingly the phase of the winding E is shifted 160 degrees from the phase of the winding A.

A circuit such as the combination circuit 400 described above in regard to FIG. 4 and FIG. 5 provides a 9-phase generator (or generator) and an 18-pulse rectifier. Such an embodiment can be advantageous in various respects. Such 18-pulse rectification (e.g., along with such a 9-phase generator) can be advantageous because such rectification can reduce or minimize torque ripple and provide low-ripple DC output power, and can enable good power quality without the addition of additional magnetic components for output filtering. Such an embodiment can allow for continued operation even if there is a loss of a phase during operation of the generator system. Further, the series connection of 6-pulse rectifiers obviates the need for coupled inductors that are otherwise used when 6-pulse rectifiers are paralleled to create higher pulse-number DC outputs. Also, in addition to affording high quality power, this type of system is readily scalable to provide higher voltages.

Although such a passive rectifier may be integrated into the generator in the manner that the rectifier 250 is shown in FIG. 2 to be integrated into the generator (e.g., within the generator housing 252 as shown in FIG. 2), in alternate embodiments such a passive rectifier can instead be integrated into the GCU, or housed in a separate unit.

Notwithstanding the above discussion, in at least some additional implementations of the generator 200, the AC wound field stator portion 220 includes a three-phase winding set, where the phases of each of the phases within the three-phase winding set are phase-shifted from one-another at an electrical angle of 120 degrees. Further, in some such implementations, the rectifier 250 of the generator system includes series-connected 6-pulse three-phase rectifiers, where each of the 6-pulse rectifiers is connected to the three-phase winding set from the generator (stator). Again, although such a passive rectifier may be integrated into the generator in the manner that the rectifier 250 is shown in FIG. 2 to be integrated into the generator (e.g., within the generator housing 252 as shown in FIG. 2), in alternate embodiments such a passive rectifier can instead be integrated into the GCU, or housed in a separate unit, Also, in at least some additional implementations, the permanent magnets 222 implemented on the rotor 208 are sized to provide sufficient energy for start-up excitation when no external source of electrical power is available, while minimizing permanent magnet material mass (cost). Such an arrangement can minimize cost and permanent magnet material requirements. In a further implementation, the rectifier 250 takes the form of a passive AC-to-DC rectifier, which can provide DC output while minimizing complexity and cost. In an additional implementation, the rectifier 250 takes the form of an active AC-to-DC rectifier, which can improve power quality. Also, in an additional implementation, the rectifier 250 takes the form of a bi-directional AC-to-DC converter, which can provide benefits of active rectification while enabling motoring operation for engine start or supplemental propulsion.

Figure 6:
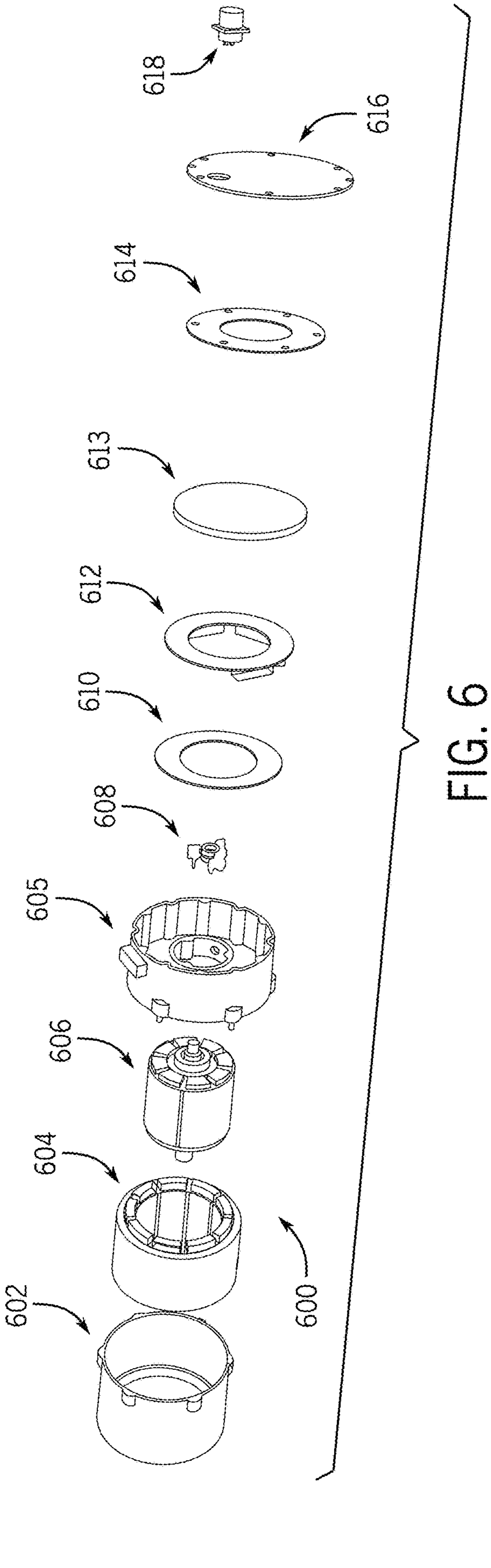
FIG. 6 is an exploded, perspective view of portions of an example improved generator system in accordance with an example embodiment encompassed herein.

The improved generator system 200 of FIG. 2 can take any of a variety of physical forms. FIG. 6 provides of an exploded, perspective view of portions 600 of an improved generator system in accordance with one example implementation. In this embodiment, the portions 600 include a generator housing 602, a stator 604 (in this example, having nine phases), a rotor 606 (in this example having eight poles), an electronics housing 605, brushes (of a slipring system) 608, a rectifier (or rectifier board) 610, a DC link 612, a brush cover 613, a GCU (or GCU board) 614, an end cover 616, and a connector 618. In the present example embodiment, the generator system is configured to support the GCU 614 within the generator housing 602. Accordingly, in FIG. 6, the portions 600 shown in FIG. 6 include not only the rectifier 610 but also the GCU 614 (as well as the DC link 612). The rectifier 610 includes diodes and a copper clad printed circuit board (PCB) that aids in cooling. It should be appreciated that the POR (not shown) would typically be coupled electrically to, but located externally of, the portions of generator system that are shown in FIG. 6. The electronics housing 605 can include one or more terminals or ports, for example to allow for the communication of DC power from inside the generator housing 602 (e.g., from the rectifier 610) to a location external of the generator housing. Also for example, the connector 618 can allow for electrical communications between the portions 600 and locations external thereof such as, for example, low voltage or small signals such as sensing or control signals for provision to the GCU 614.

Figure 3:
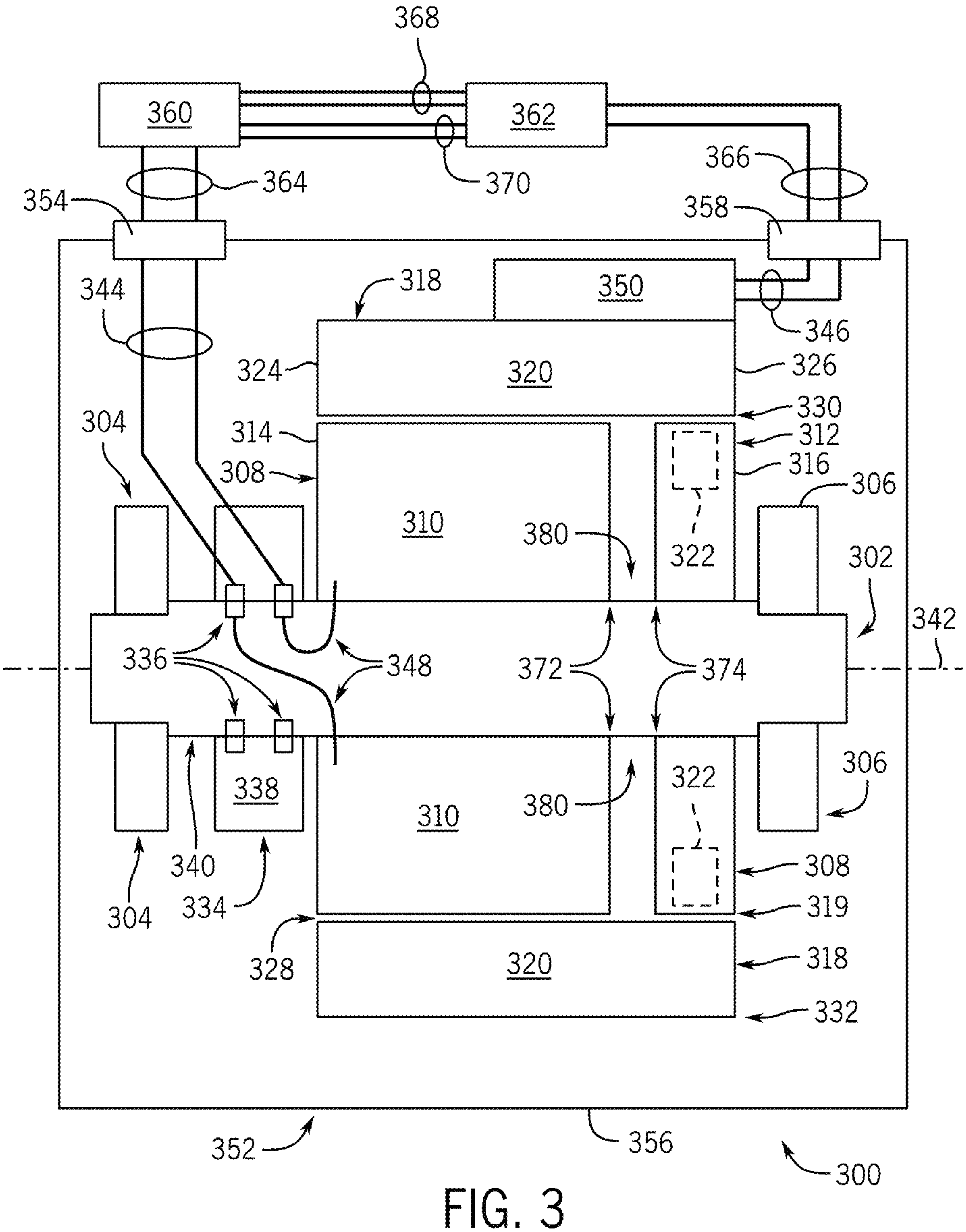
FIG. 3 is a schematic, substantially cross-sectional view of an improved electric power generation system, where the cross-section is taken along a central axis of a central shaft of the electric power generation system, in accordance with an alternate example embodiment encompassed herein.

In addition to the above-discussed embodiments, the present disclosure is intended to encompass numerous alternate embodiments of generator systems. For example, referring to FIG. 3, a schematic, substantially cross-sectional view is provided of an improved electric power generator system (or improved electric power generation system) 300 in accordance with an alternate example embodiment encompassed herein. As with respect to the generator system 200, the generator system 300 is suitable for use in, or in relation to, a variety of applications including, for example, to provide electric power to an airplane or aircraft. As shown, the generator system 300 includes a central shaft 302 rotatably supported upon first and second bearings 304 and 306, respectively, and the cross-sectional view provided FIG. 3 is particularly taken along a central axis 342 of the central shaft 302. The central shaft 302 in turn supports a rotor 308 between the first and second bearings 304 and 306.

In the present embodiment, the rotor 308 again is a hybrid rotor in that it includes both a first, direct current (DC) wound field rotor portion (or portions) 310 and a permanent magnet (PM) rotor portion (or portions) 312. The DC wound field rotor portion 310 particularly includes (or is made up of or formed by) wire windings that extend radially outward from the central shaft 302 to an outer cylindrical (or annular) perimeter 319 of the rotor. Further, the PM rotor portion 312 again can be understood to include a plurality of discrete permanent magnets 322. Although only two of the permanent magnets 322 are visible in FIG. 3 given the particular cross-sectional view that is provided, it should be appreciated that there can be additional ones (for example, four more) of the permanent magnets that are spaced around the PM rotor portion 312.

Further as shown, the generator system 300 also includes a stator 318, which can also be referred to as a main stator. The stator 318 can be identical to, or substantially similar to, the stator 218. As shown, the stator 318 is arranged to be concentrically positioned about, and axially-aligned along the central axis 342 with, the rotor 308. More particularly, the stator 318 extends axially, along the central axis 342, between a first end 324 and a second end 326 of the stator, which respectively are axially aligned with a first end 314 and a second end 316 of the rotor 308. An annular air gap 328 exists between the outer cylindrical perimeter 319 of the rotor 308 and an inner cylindrical (or annular) perimeter 330 of the stator 318. As with the stator 218, the stator 318 is an AC wound field stator that includes wire windings arranged around substantially the entire axial length of the stator 318 between the first end 324 and the second end 326. In the present embodiment, the wire windings of the stator 218 also can be considered to occupy an annular region of the stator 318 extending radially outward (away from the central axis 342) from the inner cylindrical perimeter 330 to an outer cylindrical (or annular) perimeter 332 of the stator, and these wire windings can be referred to as an AC wound field stator portion 320.

Additionally, the generator system 300 includes a slipring system 334 that in the present embodiment is provided along the central shaft 302 proximate the first bearing 304. The slipring system 334 includes two (or more) sliprings 336 that are mounted along an exterior surface 340 of the central shaft. Also, the slipring system 334 additionally includes a slipring interfacing system (or mechanism) 338 that is positioned along the central shaft 302 proximate (or adjacent) to the exterior surface 340, and that can extend circumferentially or concentrically around the central shaft (and the central axis 342). As with the slipring interfacing system 238 of FIG. 2, the slipring interfacing system 338 includes or is connected to electrical connectors (or linkages) 344 by which the slipring interfacing system can obtain DC input power. Also, the sliprings 336 are coupled to the windings of the rotor 318 by electrical connectors (or linkages) 348, which can also be considered part of the slipring system 334. The electrical connectors 348 extend along the central shaft 302 between the sliprings 336 and the DC wound field rotor portion 310 of the rotor 308 and in some embodiments can for example be extensions of the wire windings of the rotor. As with the slipring interfacing system 238 and sliprings 236, the slipring interfacing system 338 and the sliprings 336 particularly are configured to allow for electrical connections to be established therebetween, notwithstanding relative rotation of the central shaft 302 and the sliprings 336 relative to the slipring interfacing system. Accordingly, DC electric power received at the slipring interfacing system 338 by the electrical connectors 344 can in turn be communicated to the wire windings of the DC wound field rotor portion 310 by the sliprings 336 and the electrical connectors 348.

Further as illustrated, in the present embodiment a rectifier 350 is mounted on the stator 318, for example, along the outer cylindrical perimeter 332. The rectifier 350 can be identical or substantially similar to the rectifier 250, in terms of its structures and manner of operation. Additionally, in the present embodiment, all of the central shaft 302, bearings 304 and 306, rotor 308, stator 318, slipring system 334, rectifier 350, and electrical connectors 344, 346, and 348 are generally situated and supported within a generator housing (or packaging) 352 of the generator system 300. The central shaft 302 and rotor 308 particularly are rotatably supported in relation to the generating housing 352 by the bearings 304 and 306. Further as shown, the electrical connectors 344 are coupled between the slipring interfacing system 338 and a connector (or port) 354 formed along a wall or perimeter 356 of the generator housing 352. Also, electrical connectors 346 are coupled between the rectifier 350 and a terminal block 358 formed along the wall or perimeter 356.

Additionally, in the present embodiment, the generator system 300 includes a generator control unit (GCU) 360, which also can include a power converter and/or be considered a GCU/converter, and a point of regulation (POR) 362. The GCU 360 is coupled to the connector 354, and thereby to the slipring interfacing system 338 by the electrical connectors 344, by additional electrical connectors (or linkages) 364. Additionally, the POR 362 is coupled to the terminal block 358 by additional electrical connectors (or linkages) 366. Further, the POR 362 is coupled to the GCU 360 by additional electrical connectors (linkages) 368 and also additional electrical connectors (linkages) 370. The additional electrical connectors 366 allow for electric power received at the terminal block 358, from the rectifier 350 by the electrical connectors 346, to be communicated to the POR 362, which can in turn provide that power to systems of the airplane/aircraft (by additional electrical connectors or linkages, not shown). The additional electrical connectors 368 serve to communicate signals from the POR 362 to the GCU 360 by which the GCU can sense the exact power levels that are being made available to the airplane/aircraft (e.g., at the physical location of the POR) by the generator system 300. Further, the additional electrical connectors 370 allow for excitation power (and associated currents and/or voltages) to be communicated from the POR 362 to the GCU 360. Also, the additional electrical connectors 364 allow for power (and associate currents and/or voltages) to be communicated from the GCU 360 to the connector 354, and further to the slipring interface system 338 by the electrical connectors 344.

It will be appreciated from a comparison of the generator system 300 of FIG. 3 with the generator system 200 of FIG. 2 that numerous components of the generator system 300 of FIG. 3 are identical or substantially similar to corresponding components of the generator system 200 of FIG. 2. For example, the stator 318, rectifier 350, terminal block 358, POR 362, GCU 360, connector 354, electrical connectors 344 and 346, and additional electrical connectors 364, 366, 368, and 370 respectively can be identical or substantially similar to the stator 218, rectifier 250, terminal block 258, POR 262, GCU 260, connector 254, electrical connectors 244 and 246, and additional electrical connectors 264, 266, 268, and 270, respectively.

Notwithstanding these identical or substantially similar components or features however, there are several differences between the generator system 300 and the generator system 200. First, it should be appreciated that the slipring system 334 of the generator system 300 is axially positioned between the first bearing 304 and the first end 314 of the rotor 308, which is in contrast to the arrangement in the generator system 200, in which the first bearing 204 is axially positioned between the slipring system 234 and the first end 214 of the rotor 208. Correspondingly, the electrical connectors 348 do not need to extend as great of a distance (or distances) along the central shaft 302 between the sliprings 336 and the DC wound field rotor portion 310 as do the electrical connectors 248 between the sliprings 236 and the DC wound field rotor portion 210.

Additionally, the generator system 300 of FIG. 3 differs from the generator system 200 in that the DC wound field rotor portion 310 and the PM rotor portion 312 are respectively located at first and second axial positions 360 and 362, respectively, where the first and second axial positions are different from one another and do not overlap. More particularly, in the embodiment of FIG. 3, the DC wound field rotor portion 310 is positioned between the slipring system 334 and the PM rotor portion 312 (and thus between the first bearing 304 and the PM rotor portion 312), and the PM rotor portion 312 is positioned between the DC wound field rotor portion 310 and the second bearing 306.

Further as shown, in the present embodiment, the DC wound field rotor portion 310 extends axially from the first end 314 toward the PM rotor portion 312 to a first intermediate axial location 372 (which is farther from the first bearing 304 than is the first end 314), and the PM rotor portion extends axially from the second end 316 toward the DC wound field rotor portion 310 to a second intermediate axial location 374 (which is farther from the second bearing 306 than is the second end 316). Also, in the present example embodiment, an annular space 380 exists between the first intermediate axial location 372 and the second intermediate axial location 374. In alternate embodiments, the annular space 380 can be relatively smaller or larger and, in some such embodiments, the first intermediate axial location 372 can be the same axial location as the second intermediate axial location 374 such that the DC wound field rotor portion 310 abuts or is integrated with the PM rotor portion 312 (and such that the annular space is no longer present). Given this to be the case, in the present description, the DC wound field rotor portion 310 and PM rotor portion 312 are referred to as jointly forming the rotor 308 even though it would also be appropriate to refer the DC wound field rotor portion and PM rotor portion as respectively forming two distinct, separate, rotors.

Notwithstanding these differences between the generator system 300 and the generator system 200, it should be recognized that the generator system 300 (at least in some implementations) can operate in a manner that is identical or substantially the same as the manner in which the generator system 200 operates as described above. Again, during an initial phase of operation, power (and/or voltages and/or currents) can be developed so as to appear at the POR 262 due merely to rotation of the PM rotor portion 312 of the rotor 308 relative to the stator 218. Also, during a ramp-up phase of operation, increasing levels of power (and/or voltages and/or currents) can be developed so as to appear at the POR 262 due not only to the rotation of the PM rotor portion 312 relative to the stator 318 but also due to the rotation of the DC wound field rotor portion 310 relative to the stator when there are DC currents flowing through the wire windings of the DC wound field rotor portion, as provided by the slipring system 334 and governed by the GCU 360. Further, during a steady-state phase of operation, desired levels of power (and/or voltages and/or currents) are provided at the POR 262, again due both to the rotation of the PM rotor portion 312 relative to the stator 318 and also due to the rotation of the DC wound field rotor portion 310 relative to the stator when there are DC currents flowing through the wire windings of the DC wound field rotor portion, as provided by the slipring system 334 and governed by the GCU 360.

Further, in addition to the improved generator systems 200 and 300 of FIG. 2 and FIG. 3 and the other embodiments and implementations described above, it should be appreciated that the present disclosure also encompasses numerous additional embodiments and implementations as well. For example, in another embodiment, the generator system 300 can be modified to have the first bearing 304 positioned axially between the rotor 308 and the slipring system 334 (in a manner identical or similar to that described with respect to the generator system 200).

Also, in other embodiments encompassed herein, the GCU, rectifier, and POR can take other forms or be arranged in manners different from those described above. For example, in one other embodiment, each of the GCU and the rectifier is positioned within the generator system, within the generator housing, and the POR is provided outside of the generator housing. In such an embodiment, for example, the GCU can be coupled between the connector 254 and the slipring interface system 238, and also coupled to the rectifier, all within the generator housing. The rectifier, in addition to being coupled to the GCU so as to be able to provide DC power to the GCU, also can be coupled to the terminal block. The POR, which is positioned outside of the generator housing, can be coupled to each of the terminal block (e.g., to receive DC power from the rectifier) and to the connector (e.g., to allow for the GCU to sense the power/voltage/current level(s) at the POR and/or possibly also to allow for DC power to be communicated from the POR to the GCU).

Further for example, in one other embodiment, there is no rectifier provided adjacent to the stator or within the generator housing, but rather a combination GCU and power converter can be provided externally of the generator housing. In such an embodiment the combination GCU and power converter can be coupled to the stator, for example by way of three electrical connectors, to receive three phases of AC electrical power from the stator. The combination GCU and power converter can in turn, based upon that received AC electrical power, both determine appropriate levels of DC current and power (and associated voltages) that are provided to the slipring system as well as develop DC power (and/or voltages or current) that is available for use by an airplane/aircraft or other system in regard to which the generator system is implemented.

Further, it should also be appreciated that, even though numerous embodiments described above envision that it is desired for DC currents, voltages, or power to be made available at a POR (or other locations, terminals, or ports) for use by an airplane/aircraft or other systems that is or are configured to operate based upon DC currents, voltages, or power, the present disclosure also encompasses embodiments in which it is AC current, voltages, or power that are made available at a POR (or other locations, terminals, or ports) for use by an airplane/aircraft or other systems. For example, in some embodiments as described above having a combination GCU and power converter located externally of the generator housing and provided with AC electrical power from the stator, it is possible that the power converter will also serve as a POR and output AC electrical power for use by an airplane/aircraft or other systems.

Also, it should be appreciated that the present disclosure encompasses numerous additional manners of operation of generators, generator systems, generation systems, as well as interactions of such generators and systems with other systems and applications, in addition to those described above. For example, in another example embodiment, an improved generator system can be operated (e.g., in accordance with the control of a GCU) to adjust operation of the electrical power generation so that, at one or more first times, the generator system operates to provide a first level of power (and/or currents and/or voltages) at a POR and, at one or more second times, the generation system operates to provide a second level of power (and/or currents and/or voltages) at the POR. In further example embodiments, the improved generator system can be operated to adjust operation so that at different times any of a variety of different power levels (and/or currents and/or voltages) are provided at a POR or at one or more PORs, terminals, or ports.

Additionally, the present disclosure also encompasses methods of manufacturing or assembling generators, generator systems, generation systems, and/or such generators or systems in regard to other systems and applications. In at least some such methods, the present disclosure includes a method of assembly in which a rotor having a DC wound field rotor portion and also a PM rotor portion (or two rotors having respectively such rotor portions) is provided on a shaft, the shaft along with the rotor is positioned so as to be supported upon bearings within a larger structure or assembly (e.g., a housing) so that the rotor (with both rotor portions) is supported within a stator having an AC wound field stator portion, and also a slipring interface assembly is mounted so as to extend alongside sliprings formed along the shaft.

One or more of the embodiments of improved generator systems (or generators or generation systems), methods of operating or manufacturing generator systems, and systems and applications employing such generator systems and methods encompassed herein are advantageous in one or more respects by comparison with conventional embodiments. For example, one or more of the improved generator systems encompassed herein are advantageous in that such generator systems do not employ or require each of three distinct electromechanical machines that are located at different respective axial positions, as are employed in conventional generator systems such as the generator system 100. More particularly, one or more of the improved generator systems encompassed herein are advantageous in that such generator systems do not employ or require each of a permanent magnet rotor, an exciter rotor, and a main rotor (with wire windings) that are axially positioned at different axial locations along a shaft, and do not employ or require each of three distinct stators that are positioned at different axial locations along the shaft. Rather at least some of the improved generator systems herein merely employ a single stator and a single rotor having a DC wound field rotor portion and a PM rotor portion (or two rotors respectively corresponding to those rotor portions).

Further, one or more of the improved generator systems encompassed herein particularly are advantageous in that the generator system neither requires any exciter machine (rotor and stator) to communicate AC power from the stator to the rotor, nor requires or employs any diodes or rectification components or systems to be implemented on or within a rotating shaft of the generator system, because the generator system instead is able to communicate DC current and power to the rotating shaft of the generator system by way of a slipring system.

Also, at least some of the improved generator systems encompassed herein are advantageous relative to such conventional generator systems in terms of being easier and less costly to manufacture and less complex than such conventional generator systems. Indeed, by comparison with such conventional generator systems, at least some of the improved generator systems herein are easier and less costly to manufacture and less complex particularly insofar as such improved generator systems have less component parts and particularly do not require three electromechanical machines at different axial positions, do not require any exciter rotor (or exciter machine), and/or do not require any diodes or rectifier components along the shaft of the generator system.

It will be appreciated from the above description that at least some embodiments or implementations of the improved generator systems and methods (and systems employing same) encompassed herein can serve to improve safety by comparison with at least some conventional systems or methods. At the same time, it should be appreciated that the use of the term "safety" herein is not a representation that any of the systems or methods encompassed by the present disclosure will make any environment, process, system, or circumstance safe, or that other systems or methods will produce unsafe operation. Safety in any environment, process, system, or circumstance depends on a wide variety of factors outside of the scope of the present disclosure including, for example, the design, installation, or maintenance of the system and other components/devices interacting with the system, as well as the cooperation, training, or behavior of individuals involved with the system or method. All physical systems are susceptible to failure and provision must be made for such failure.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. An electric power generator system comprising:

a support structure;

a stator supported fixedly in relation to the support structure;

a shaft supported rotatably in relation to the support structure;

a rotor supported upon the shaft, wherein the rotor is also rotatable with respect to the support structure and with respect to the stator, wherein the rotor includes each of a direct current (DC) wound field rotor portion having wire windings and a permanent magnet (PM) rotor portion;

a slipring system including sliprings supported on the shaft and a slipring interface system supported fixedly in relation to the support structure, wherein the sliprings are electrically coupled to the wire windings;

at least one control device coupled at least indirectly between the stator and the slipring system, wherein the at least one control device includes a rectifier within the support structure; and an output port that is coupled at least indirectly to the at least one control device or to the stator, and that is configured to make available an output power based at least indirectly upon alternating current (AC) power output by the stator when the rotor rotates relative to the stator, wherein the at least one control device is configured to be able to generate, and communicate to the slipring interface system, DC current based at least indirectly upon the AC power output by the stator when the rotor rotates relative to the stator, so that at a first time the AC power output includes each of a first component arising due to a first rotating of the PM rotor portion relative to the stator and also a second component arising due to a second rotating of the DC wound field rotor portion relative to the stator when the DC current communicated to the slipring interface system is further communicated to the sliprings and to the wire windings.

2. The electric power generator system of claim 1, wherein the PM rotor portion includes a plurality of permanent magnets arranged respectively at a plurality of circumferential locations around the rotor, where the circumferential locations are respectively positioned along a central axis of the shaft at respective axial positions that are aligned axially with one or more of the wire windings of the DC wound field rotor portion.

3. The electric power generator system of claim 2, wherein the PM rotor portion is integrated within the DC wound field rotor portion.

4. The electric power generator system of claim 2, wherein the plurality of permanent magnets are arranged on the rotor between a first axial end of the DC wound field rotor portion and a second axial end of the DC wound field rotor portion.

5. The electric power generator system of claim 4, wherein the permanent magnets are arranged substantially midway between the first axial end and the second axial end, and wherein the plurality of permanent magnets includes six of the permanent magnets, wherein each of the permanent magnets is circumferentially spaced apart from respective neighboring ones of the permanent magnets by substantially 60 degree intervals.

6. The electric power generator system of claim 2, wherein the permanent magnets are arranged along or proximate to an outer cylindrical surface of the rotor.

7. The electric power generator system of claim 1, wherein the PM rotor portion includes a plurality of permanent magnets that are arranged on the rotor between a first axial end of the rotor and a second axial end of the rotor.

8. The electric power generator system of claim 7, wherein the DC wound field rotor portion is positioned between the first bearing and the PM rotor portion, and wherein the PM rotor portion is positioned between the second bearing and the DC wound field rotor portion.

9. The electric power generator system of claim 8, wherein the PM rotor portion is distinct from and axially spaced apart from the DC wound field rotor portion.

10. The electric power generation system of claim 1, wherein at least one control device coupled at least indirectly between the stator and the slipring system includes each of the rectifier and a general control unit (GCU).

11. The electrical power generation system of claim 10, wherein the output port is provided at a point of regulation (POR), wherein the rectifier is coupled at least indirectly between the stator and the POR, wherein the POR is coupled at least indirectly between the rectifier and the GCU, and wherein the output power made available at the POR is DC power.

12. The electrical power generation system of claim 11, wherein the support structure includes a housing, wherein the rotor, the stator, and the rectifier are all supported within the housing, wherein the rectifier is coupled directly to the stator so as to receive AC power output from the stator, wherein the rectifier is coupled to a terminal block provided along the housing, wherein the POR is coupled by first electrical connectors to the terminal block, and wherein the GCU is coupled at least indirectly to the slipring interface system, and wherein the rectifier is an 18-pulse rectifier that is coupled to a nine-phase main stator winding of the stator.

13. The electrical power generation system of claim 12, wherein the GCU is coupled to the POR by at least one second electrical connector so that the GCU can sense a characteristic of the DC power, and also so that the GCU can receive at least some of the DC power by which the GCU can generate the DC current that is communicated to the slipring interface system.

14. The electrical power generation system of claim 1, wherein the DC current generated by the at least one control device, when electrical power generation system is operating in a steady-state operational phase at the first time, is set so that the output power made available at the output port has a desired power characteristic.

15. An aircraft system comprising the electrical power generation system of claim 1, further comprising a load that is coupled to the output port to receive the output power.

16. A method of generating electric power, the method comprising:

providing an electric power generator system, the electric power generator system including
- a support structure;
- a stator supported fixedly in relation to the support structure;
- a shaft supported rotatably in relation to the support structure;
- a rotor supported upon the shaft,
- wherein the rotor includes each of a direct current (DC) wound field rotor portion having wire windings and a permanent magnet (PM) rotor portion;
- a slipring system including a slipring interface system and sliprings supported on the shaft and electrically coupled to the wire windings;
- at least one control device coupled at least indirectly between the stator and the slipring system, the at least one control device including a rectifier; and
- a point of regulation (POR) that is coupled at least indirectly to the at least one control device or to the stator;

during an initial operational phase, generating a first power having a first electrical characteristic that appears at the POR, the first power being based at least indirectly upon a first alternating current (AC) power output by the stator only or substantially only in response to a first rotating of the PM rotor portion relative to the stator;

during a ramp-up operational phase, generating a second power having a second electrical characteristic that appears at the POR, the second power being based at least indirectly upon a second AC power output by the stator in response to both of a second rotating of the PM rotor portion relative to the stator and a third rotating of the DC wound field rotor portion relative to the stator when a first DC current provided by the at least one control device at least indirectly to the slipring system is flowing through the wire windings; and during a steady-state operational phase, generating a third power having a desired electrical characteristic that appears at the POR, the third power being based at least indirectly upon a third AC power output by the stator in response to both of a fourth rotating of the PM rotor portion relative to the stator and a fifth rotating of the DC wound field rotor portion relative to the stator when a second DC current provided by the at least one control device at least indirectly to the slipring system is flowing through the wire windings.

17. The method of claim 16 wherein, during the ramp-up operational phase, the first DC current is generated by the at least one control device based upon at least some received power based at least indirectly upon the first AC output power, the second AC output power, the third AC output power, or an additional AC output power output by the stator, when the at least one control device senses that a detected electrical characteristic appearing at the POR is not, or is not substantially, the desired electrical characteristic.

18. The method of claim 16 wherein, during the steady-state operational phase, the second DC current is generated by the at least one control device based upon at least some received power based at least indirectly upon the first AC output power, the second AC output power, the third AC output power, or an additional AC output power output by the stator, when the at least one control device senses that a detected electrical characteristic appearing at the output power is, or is substantially, the desired electrical characteristic.

19. The system of claim 18, further comprising an 18-pulse rectifier that is coupled to the nine-phase main stator winding.

20. An electrical power generation system comprising:

a support structure;

a stator supported fixedly in relation to the support structure, wherein the stator includes a nine-phase main stator winding includes first, second, and third three-phase winding sets;

a shaft supported rotatably in relation to the support structure;

a rotor supported upon the shaft, wherein the rotor is also rotatable with respect to the support structure and with respect to the stator, wherein the rotor includes each of a direct current (DC) wound field rotor portion having wire windings and a permanent magnet (PM) rotor portion;

a slipring system including sliprings supported on the shaft and a slipring interface system supported fixedly in relation to the support structure, wherein the sliprings are electrically coupled to the wire windings;

an output port that is coupled at least indirectly to the stator, and that is configured to make available an output power based at least indirectly upon an alternating current (AC) power output by the stator due to one or both of a first rotating of the PM rotor portion relative to the stator and a second rotating of the wire windings relative to the stator when a DC current is flowing through the windings; and means for outputting the DC current to the slipring system so that the DC current can proceed to flow via the slipring system to and through the wire windings, wherein the DC current is determined based upon how at least one sensed electrical characteristic of the output power compares to a desired output power electrical characteristic.

* * * * *